US009448622B2

(12) United States Patent
Ishihara et al.

(10) Patent No.: US 9,448,622 B2
(45) Date of Patent: Sep. 20, 2016

(54) INFORMATION PROCESSING APPARATUS, INFORMATION PROCESSING METHOD, AND PROGRAM FOR GENERATING FEEDBACK TO AN OPERATOR REGARDING POSITIONAL RELATIONSHIP OF OTHER USERS NEAR A DISPLAY

(71) Applicant: SONY CORPORATION, Tokyo (JP)

(72) Inventors: Atsushi Ishihara, Kanagawa (JP); Hirotake Ichikawa, Tokyo (JP); Ichiro Sakamoto, Tokyo (JP); Mitsuru Nishibe, Chiba (JP)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 14/552,999

(22) Filed: Nov. 25, 2014

(65) Prior Publication Data

US 2015/0160721 A1    Jun. 11, 2015

(30) Foreign Application Priority Data

Dec. 6, 2013  (JP) ................................ 2013-253505

(51) Int. Cl.
*G06F 3/00* (2006.01)
*G06F 21/50* (2013.01)
*H04W 12/08* (2009.01)

(52) U.S. Cl.
CPC ............... *G06F 3/005* (2013.01); *G06F 21/50* (2013.01); *H04W 12/08* (2013.01)

(58) Field of Classification Search
CPC ....... G06F 3/005; G06F 21/50; H04W 12/08

USPC .......................................................... 726/26
See application file for complete search history.

(56) References Cited

U.S. PATENT DOCUMENTS

| 8,599,133 | B2* | 12/2013 | Lashina | G09F 27/00 345/158 |
| 2012/0001879 | A1* | 1/2012 | Lee | G06F 3/005 345/207 |
| 2013/0127725 | A1* | 5/2013 | Sugimoto | G06F 3/02 345/168 |
| 2014/0005806 | A1* | 1/2014 | Yamamoto | G05B 15/02 700/83 |
| 2014/0201844 | A1* | 7/2014 | Buck | G06F 21/50 726/26 |
| 2015/0054739 | A1* | 2/2015 | Itoh | G09G 5/00 345/156 |
| 2015/0145762 | A1* | 5/2015 | Shimura | G06F 3/017 345/156 |

FOREIGN PATENT DOCUMENTS

| JP | 2010-026327 A | 2/2010 | |
| KR | WO 2011139115 A2 * | 11/2011 | ............. H04L 67/38 |

* cited by examiner

*Primary Examiner* — Larry Sternbane
(74) *Attorney, Agent, or Firm* — Chip Law Group

(57) ABSTRACT

There is provided an information processing apparatus including a positional relationship acquiring unit configured to acquire information of a positional relationship of users near a display with respect to the display, and a feedback generation unit configured to generate feedback information for a first user on a basis of the information of the positional relationship, the first user being a user among the users and operating or owning content displayed on the display.

19 Claims, 15 Drawing Sheets

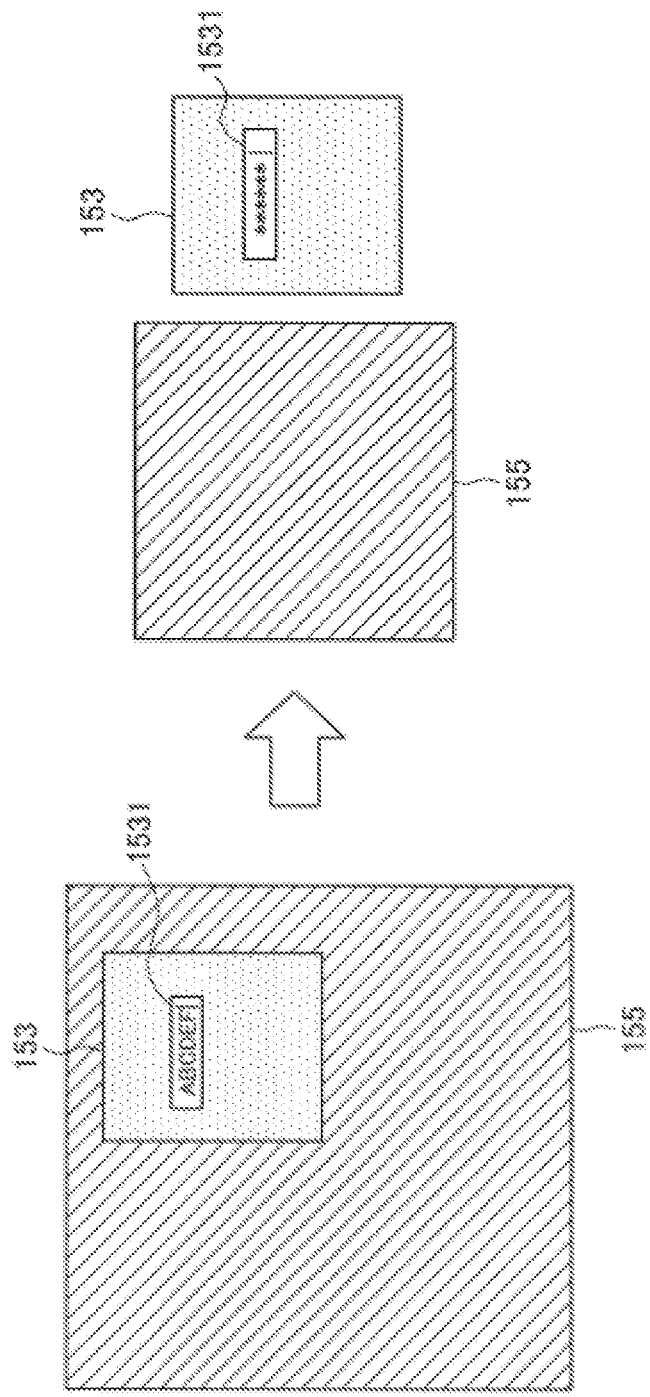

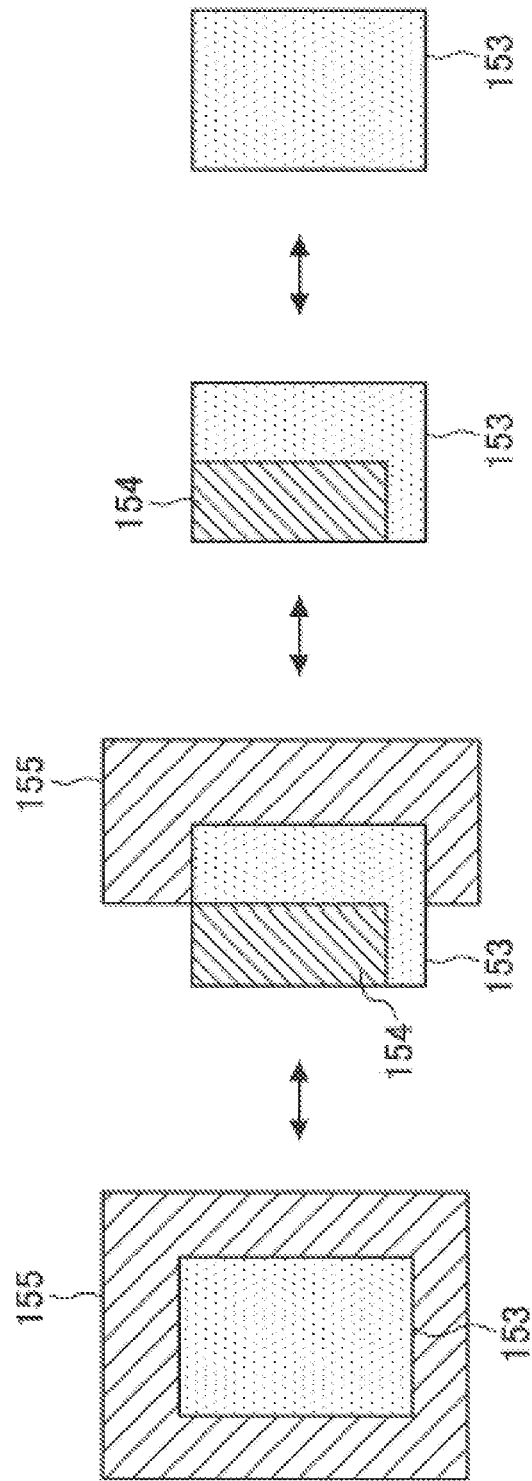

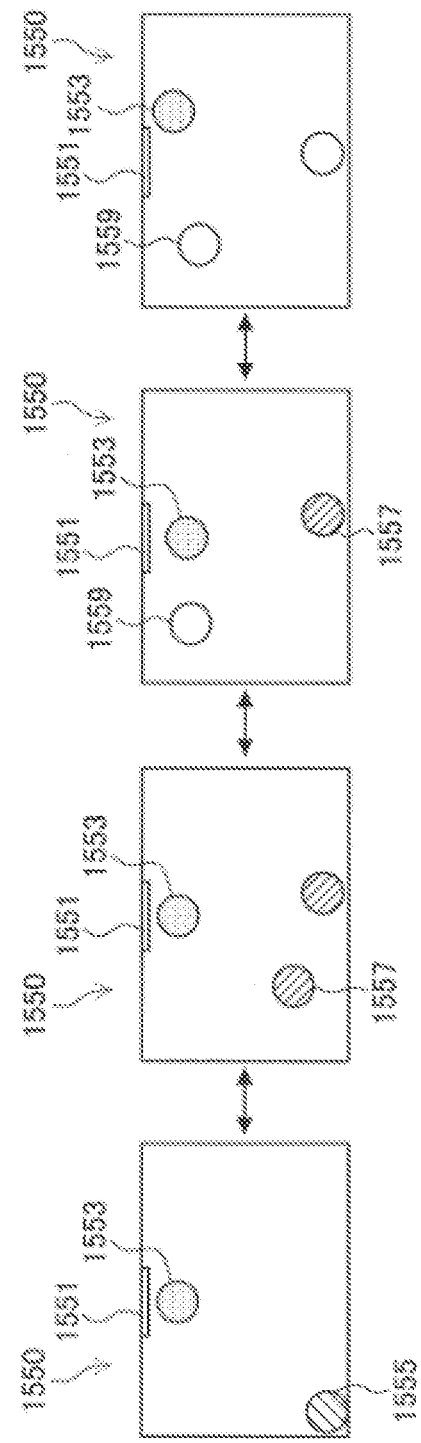

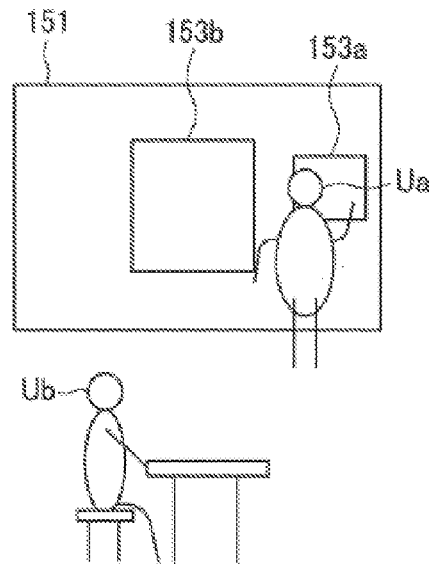 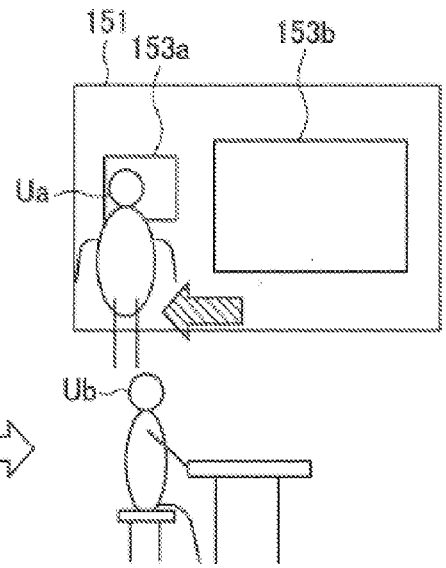
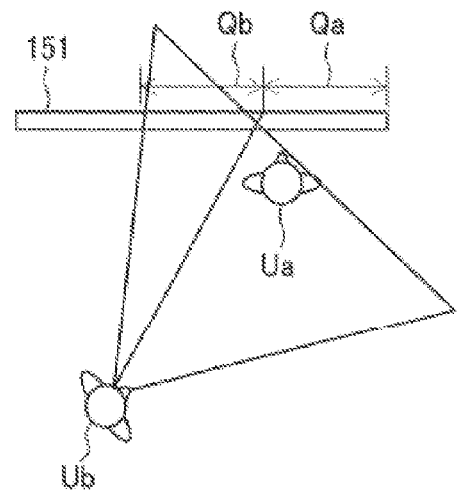 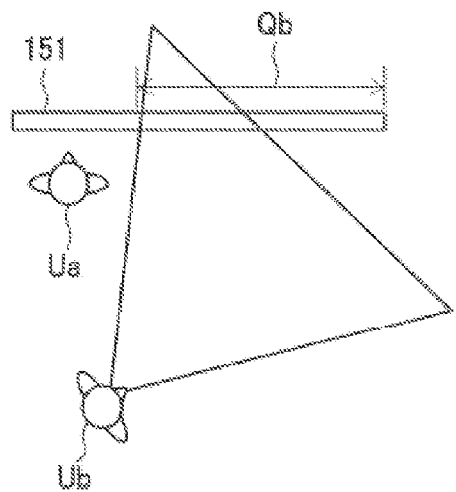
FIG. 12A                FIG. 12B

INFORMATION PROCESSING APPARATUS, INFORMATION PROCESSING METHOD, AND PROGRAM FOR GENERATING FEEDBACK TO AN OPERATOR REGARDING POSITIONAL RELATIONSHIP OF OTHER USERS NEAR A DISPLAY

CROSS REFERENCE TO RELATED APPLICATIONS

This application claims the benefit of Japanese Priority Patent Application JP 2013-253505 filed Dec. 6, 2013, the entire contents of which are incorporated herein by reference.

BACKGROUND

The disclosure relates to an information processing apparatus, an information processing method, and a program.

In recent years, a display device that uses a large touch panel to allow a plurality of users to operate the display device at the same time is becoming widely spread. In the display device, a plurality of windows are displayed on the display and the plurality of users carry out input of operations on the windows. As a technique related to such a display device, JP 2010-26327A proposes a technique for suitably adjusting the size and position of the window in accordance with the position of the user.

SUMMARY

However, the technique described in JP 2010-26327A does not allow content displayed on a display to be viewed or operated while considering the positional relationship with the other users, in a case in which a plurality of users are present in the vicinity of the display. For example, a technique for enjoying content together with other users or hiding the content from other users has not yet been realized.

Accordingly, the disclosure proposes a novel and improved information processing apparatus, information processing method, and program that allows, in a display that is visually recognized by each of a plurality of users, the content that is displayed on the display to be while considering the positional relationship with the other users.

According to an embodiment of the present disclosure, there is provided an information processing apparatus including a positional relationship acquiring unit configured to acquire information of a positional relationship of users near a display with respect to the display, and a feedback generation unit configured to generate feedback information for a first user on a basis of the information of the positional relationship, the first user being a user among the users and operating or owning content displayed on the display.

According to another embodiment of the present disclosure, there is provided an information processing method including acquiring information of a positional relationship of users near a display with respect to the display, and generating, with a processor, feedback information for a first user on a basis of the information of the positional relationship, the first user being a user among the users and operating or owning content displayed on the display.

According to another embodiment of the present disclosure, there is provided a program for causing a computer to execute a function of acquiring information of a positional relationship of users near a display with respect to the display, and a function of generating feedback information for a first user on a basis of the information of the positional relationship, the first user being a user among the users and operating or owning content displayed on the display.

As described above, the disclosure allows, in a display that is visually recognized by each of a plurality of users, the content that is displayed on the display while considering the positional relationship with the other users.

Note that the above-described effects are not exhaustive and together with the above-described effects, or in place of the above-described effects, either of the effects illustrated in the specification or other effects that can be perceived from the specification may be obtained.

BRIEF DESCRIPTION OF THE DRAWINGS

FIGS. 4A and 4B are each a diagram illustrating a first example of the feedback information according to the first embodiment of the disclosure;

FIGS. 10A, 10B, 10C, and 10D are each a diagram illustrating a first example of the feedback information according to the third embodiment of the disclosure;

FIGS. 11A, 11B, 11C, and 11D are each a diagram illustrating a second example of the feedback information according to the third embodiment of the disclosure;

FIGS. 12A and 12B are each a diagram for describing an exemplary state according to a fourth embodiment of the disclosure;

DETAILED DESCRIPTION OF THE EMBODIMENTS

Figure 1:
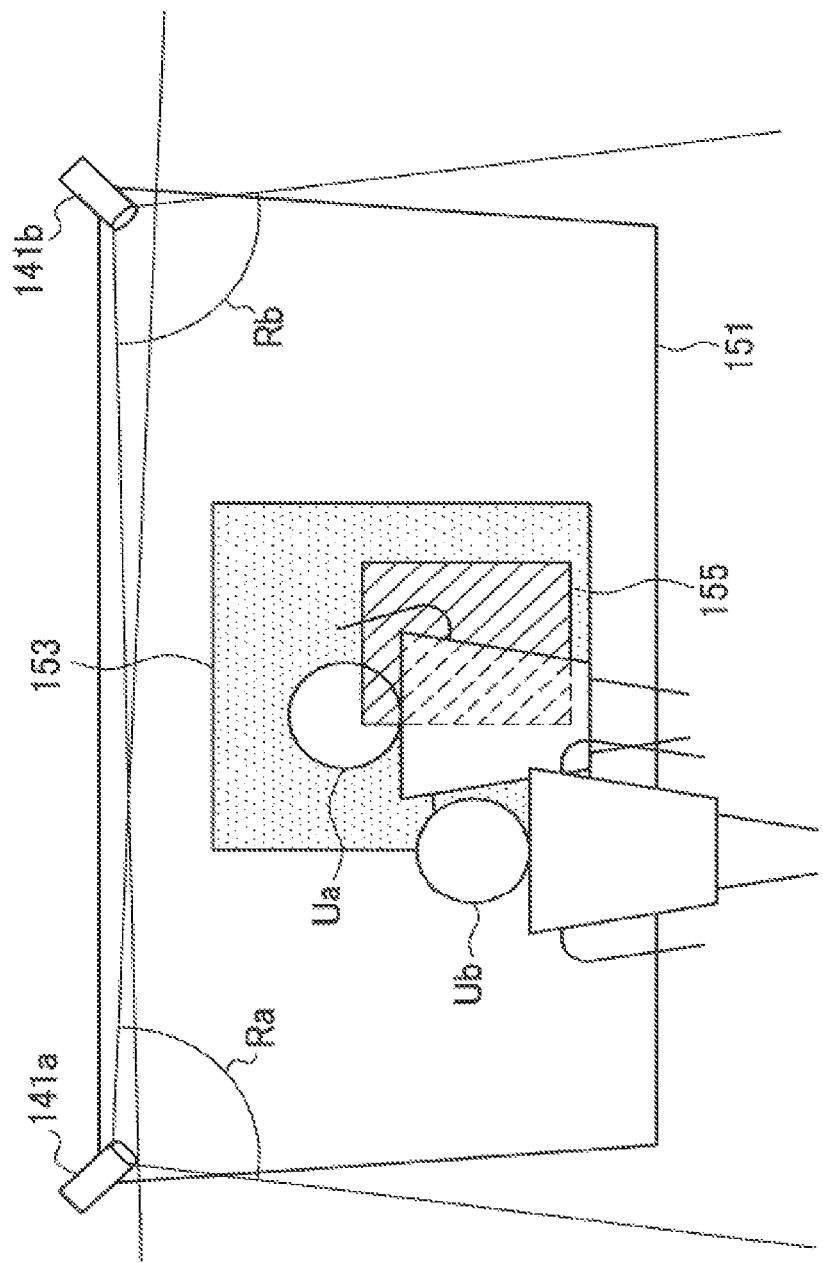
FIG. 1 is a diagram for briefly describing a first embodiment of the disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. First embodiment
1-1. Outline
1-2. Functional configuration
1-3. Flow of process
1-4. Examples of feedback information
2. Second embodiment
3. Third embodiment
4. Fourth embodiment
5. Hardware configuration
6. Supplemental description

1. First Embodiment (1-1. Outline)

FIG. 1 is a drawing for briefly describing a first embodiment of the disclosure. Referring to FIG. 1, users Ua and Ub are in front of a display 151. Content 153 is displayed on the display 151. The user Ua operates the content 153 with a touch operation through a touch panel or a gesture operation through a camera, for example. Meanwhile, the user Ub is positioned behind the user Ua when viewed from the display 151. At this time, an area that the user Ub can visually recognize and a shielded area 155 that is shielded from the user Ub because of being hidden by the user Ua are created in the display 151 (larger than the user Ua).

In the present embodiment, the positional relationship between the display 151 and the users Ua and Ub are computed and feedback information indicating the shielded area 155 that has been specified on the basis of the positional relationship is output to the user Ua. The positional relationship between the display 151 and the users Ua and Ub can be computed on the basis of images taken by cameras 141a and 141b each having a fixed positional relationship with the display 151. If the users Ua and Ub are inside both recognition ranges Ra and Rb of the cameras 141a and 141b, the positional relationship between the display 151 and the users Ua and Ub can be computed using the principle of triangulation. Note that the computation method of the positional relationship is not limited to the above example and various known methods may be used such as, for example, combining a camera and a distance sensor. For example, the positional relationship with each user may be detected using an infrared sensor.

By being provided with feedback information indicating the shielded area 155, the user Ua can operate the content 153 while understanding which portion of the content 153 can be recognized by the user Ub. The feedback information indicating the shielded area 155 can be useful to the user Ua when the user Ua wants to show some or all of the content 153 to the user Ub or, on the other hand, when the user Ua does not want to show some or any of the content 153 to the user Ub, for example. Furthermore, if it is known in advance whether the user Ua wants to show a portion or all of the content 153 to the user Ub, the feedback information may be output so that a portion of the content 153 that is outside the shielded area 155 is automatically hided. Note that further specific examples of the feedback information will be described later.

(1-2. Functional Configuration)

Figure 2:
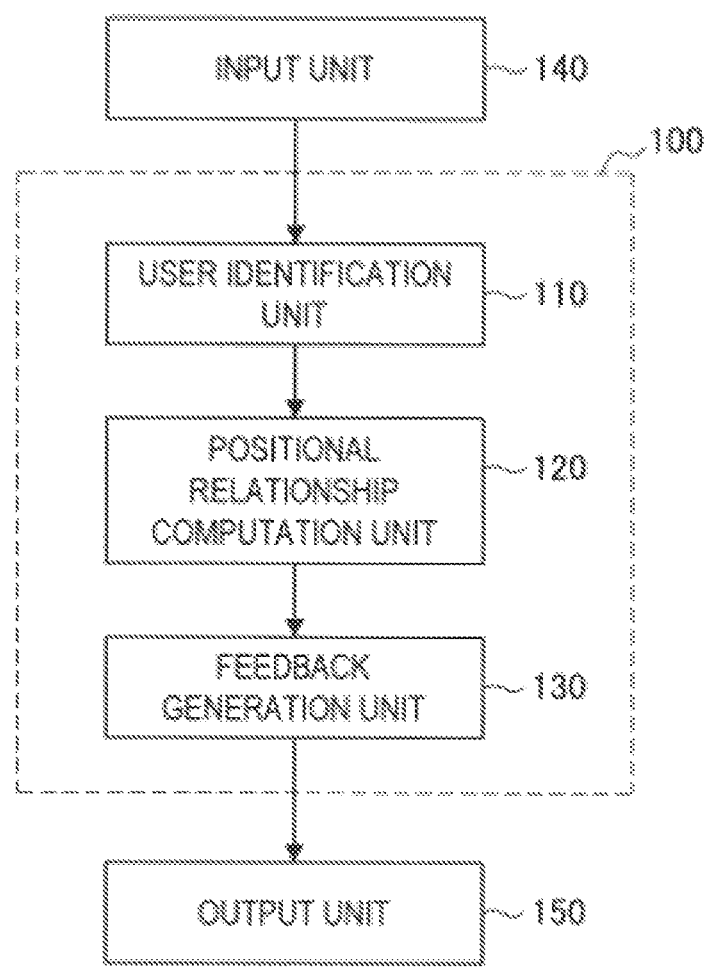
FIG. 2 is a block diagram illustrating a schematic functional configuration of an information processing apparatus according to the first embodiment of the disclosure.

FIG. 2 is a block diagram illustrating a schematic functional configuration of the information processing apparatus according to the first embodiment of the disclosure. Referring to FIG. 2, an information processing apparatus 100 includes a user identification unit 110, a positional relationship computation unit 120, and a feedback generation unit 130. Furthermore, the information processing apparatus 100 may further include either one or both of an input unit 140 and an output unit 150.

The information processing apparatus 100 may be a circuit component embedded in a display device, for example. In such a case, the information processing apparatus 100 itself does not include an input unit or an output unit, acquires information input through the display device, and provides information output from the display device. Alternatively, the information processing apparatus 100 may be a server that communicates with the display device through a network and that controls the displayed content on the display device. In such a case as well, the information processing apparatus 100 itself does not include any input unit or output unit. In other words, various calculations such as generation of the feedback information described later may be executed on a server in a cloud and be displayed.

Furthermore, the information processing apparatus 100 may be a display device, for example. In such a case, the information processing apparatus 100 includes at least either one of the input unit 140 and the output unit 150. The display device may be a display such as a liquid crystal display (LCD) or an organic electroluminescence (EL) display, or may be a projector. Furthermore, the display device may be a combination of a plurality of display devices working together to implement a display having a larger display area.

Note that the examples of the hardware configuration that can implement the information processing apparatus 100 will be described later. Furthermore, in the following description, the display 151 and the users Ua and Ub that are described above with reference to FIG. 1 are used as examples of the display and the users; however, the functions of each portion of the information processing apparatus 100 are not limited to that of the example described with reference to FIG. 1.

The user identification unit 110 is implemented with a processor, for example. The user identification unit 110 identifies a user that is in the vicinity of the display 151 included in the output unit 150. More specifically, the user identification unit 110 identifies the users Ua and Ub that are included in the image taken by each of the cameras 141a and 141b included in the input unit 140, for example. Herein, identification of the user may refer to, for example, uniquely identifying the users Ua and Ub by using a face recognition technique so as to associate the users Ua and Ub with user IDs that are registered in the system or may identify the users Ua and Ub included in the images taken by the cameras 141a and 141b each as a same person. In such a case, since who the identified users are do not necessary have to be known, the users may be identified not only by their faces but by their clothes, their posture, and the like, as necessary.

Note that as described above, the input unit 140 may include, other than the cameras, a sensor and the like. In such a case, the user identification unit 110 can identify the user on the basis of an image taken by at least a single camera included in the input unit 140. Furthermore, other than the camera or the sensor that acquires information for computing the positional relationship, the input unit 140 may include a camera for acquiring an image that is provided to the user identification unit 110.

The positional relationship computation unit 120 is implemented with a processor, for example. The positional relationship computation unit 120 computes the positional relationship between the users Ua and Ub identified by the user identification unit 110 and the display 151 included in the output unit 150. More specifically, the positional relationship computation unit 120 computes the positional relationship between the users Ua and Ub, which are identified by the user identification unit 110 on the basis of the images taken by the cameras 141*a* and 141*b* included in the input unit 140, and the display 151 by applying the principle of triangulation to the images taken by the cameras 141*a* and 141*b*.

Note that as described above, the input unit 140 may include a device other than the camera as a device to acquire information to compute the positional relationship. For example, when the input unit 140 includes a camera and a distance sensor, the positional relationship computation unit 120 may compute the positional relationship between each user and the display 151 by specifying a direction in which each users are present with respect to the display 151 on the basis of an image provided by the camera and, further, by specifying a distance of each user from the display 151 on the basis of a detection value of the distance sensor.

The feedback generation unit 130 is implemented with a processor, for example. The feedback generation unit 130 generates feedback information for the user Ua who operates or owns the content 153 displayed on the display 151 on the basis of the positional relationship computed by the positional relationship computation unit 120. More specifically, first, the feedback generation unit 130 specifies the user Ua regulating the content 153, for example. For example, when the user identification unit 110 uniquely identifies each user, the feedback generation unit 130 may specify the user Ua on the basis of owner information set in the content 153. Alternatively, when the user identification unit 110 anonymously identifies the user, the feedback generation unit 130 may specify the user positioned in front of the content 153 displayed on the display 151 as the user Ua, for example.

Subsequently, on the basis of the positional relationship, which have been computed by the positional relationship computation unit 120, between the user Ua that is operating the content 153 and the other users (while user Ub is illustrated in the example in FIG. 1, there may be a plurality of users), the feedback generation unit 130 estimates the shielded area 155 in the display 151 that is shielded to the users other than the user Ua and generates feedback information on the basis of the estimation result of the shielded area 155. The generated feedback information may include output control information for controlling the output of the display 151 and the like included in the output unit 150. For example, characters and figures indicating the shielded area 155 and the like may be displayed on the display 151 on the basis of the feedback information. Furthermore, on the basis of the feedback information, the display of the content 153 on the display 151 may be changed in accordance with the positional relationship with the shielded area 155.

As described above, the input unit 140 may be implemented in a device that is separate from the information processing apparatus 100 or may be included in the information processing apparatus 100. The input unit 140 may, for example as illustrated in FIG. 1, include the plurality of cameras 141*a* and 141*b*, may include a combination of a camera and a sensor such as a distance sensor, or may include only a sensor. When the input unit 140 only includes a sensor, the input unit 140 may further include a camera for identifying the user. Input information received by the input unit 140 is provided to the user identification unit 110 and the positional relationship computation unit 120.

As described above, the output unit 150 may be implemented in a device that is separate from the information processing apparatus 100 or may be included in the information processing apparatus 100. The output unit 150 may, for example as illustrated in FIG. 1, include the display 151 and may include a speaker and a vibrator. For example, the speaker and the vibrator may be embedded in a device different from the display device including the display 151. For example, the output unit 150, including a vibrator of a mobile device carried by the user Ua, may vibrate the vibrator when the relationship between the content 153 and the shielded area 155 satisfies a predetermined condition (a portion or all of the content 153 is outside (inside) the shielded area, for example). Furthermore, the output unit 150 may include an output control unit for the display and the speaker. As described above, the feedback information generated by the feedback generation unit 130 may include the output control information. For example, when output control information for the display 151 is generated, characters and figures that indicate the shielded area 155 may be displayed on the display 151 (the characters and figures may be referred to as the feedback information). Furthermore, the display of the content 153 on the display 151 may be changed on the basis of the output control information.

(1-3. Flow of Process)

Figure 3:
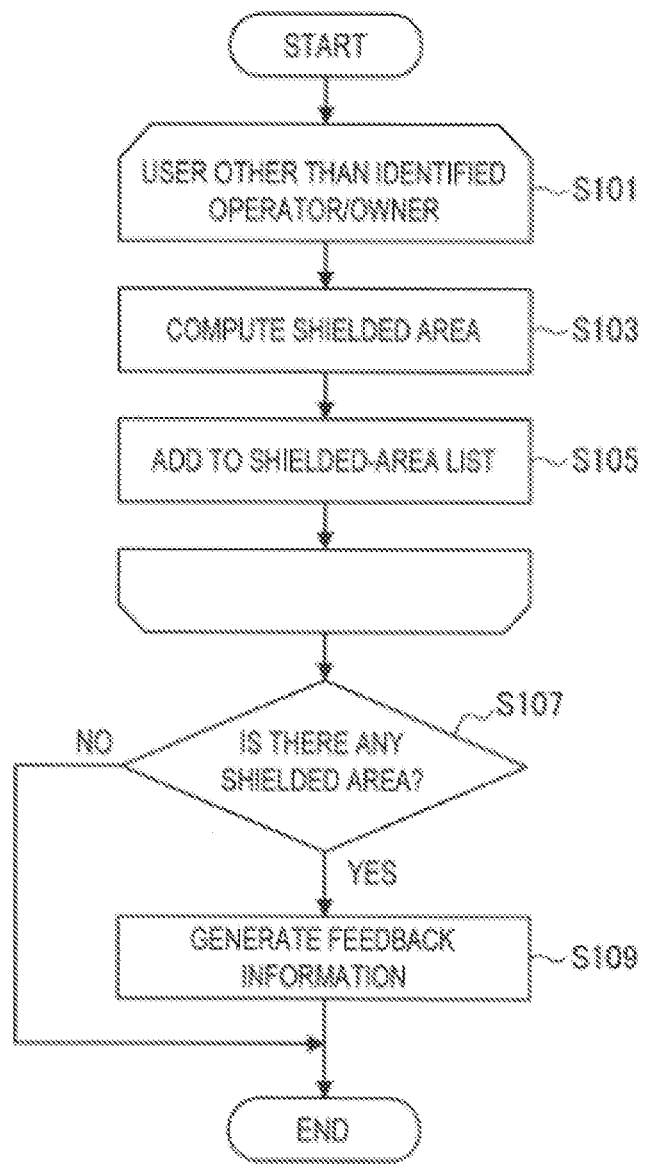
FIG. 3 is a flowchart illustrating an example of a process performed by a feedback generation unit according to the first embodiment of the disclosure.

FIG. 3 is a flowchart illustrating an example of a process performed by the feedback generation unit 130 according to the first embodiment of the disclosure. Referring to FIG. 3, first, the feedback generation unit 130 executes a loop process on the user other than the operator or the owner of the content 153 that has been identified by the user identification unit 110 (step S101). Note that the operator may be, for example, a user that is positioned in front of where the content 153 is displayed or the user who has first carried out an operation after the content 153 has been displayed. The owner may be specified by owner information set in the content 153.

In the loop process of step S101, the feedback generation unit 130 computes the shielded area of each user (step S103). In the example illustrated in FIG. 1, since there is only one user (user Ub) other than the operator or the owner (user Ua), the shielded area of the user Ub itself is specified as the shielded area 155; however, if there are more users, the shielded area of each user has to be overlapped. Accordingly, the feedback generation unit 130 adds information of the computed shielded area to a shielded-area list (step S105).

When the loop process described above is completed on all of the users other than the operator or the owner, the feedback generation unit 130 refers to the shielded-area list to determine whether there is any shielded area (step S107). If a shielded area exists, the feedback generation unit 130 generates feedback information (step S109). Note that no information indicating the shielded area is added to the shielded-area list when there is no user other than the operator or the owner. In such a case, the feedback generation unit 130 may exceptionally generate feedback information indicating that the entire display 151 is a shielded area (an area that can be viewed only by the operator or the owner).

(1-4. Examples of Feedback Information)

Hereinafter, several specific examples of the feedback information according to the present embodiment will be described. Note that in the present embodiment, as illustrated in FIG. 1, feedback information for displaying a figure indicating the shielded area 155 on the display 151 may be generated as one of the most simple feedback information.

The figure may be, for example, and arbitrary shape accurately indicating the area that the user Ub cannot visually recognize or may be a circle or a rectangle that is arranged inside such an area.

FIGS. 4A and 4B are each a diagram illustrating a first example of the feedback information according to the first embodiment of the disclosure. Referring to FIGS. 4A and 4B, the content 153 indicated on the display 151 includes a password input box 1531. As illustrated in FIG. 4A, when the content 153 is displayed inside the shielded area 155, a plaintext password is indicated in the password input box 1531. On the other hand, as illustrated in FIG. 4B, if the content 153 is indicated outside the shielded area 155, a password hidden by asterisks is indicated in the password input box 1531.

In the present example, the feedback information generated by the feedback generation unit 130 is used to determine whether to display or to hide the password included in the content 153 on the display 151. When the content 153 is signified to be displayed inside the shielded area 155 on the basis of the positional relationship computed by the positional relationship computation unit 120, the feedback generation unit 130 generates feedback information for displaying the password in plaintext. The feedback information is, for example, provided to a processor that generates a display image of the display 151, and an image of the content 153 including the password input box 1531 in which a plaintext password is displayed is displayed on the display 151. On the other hand, when the content 153 is signified to be displayed outside the shielded area 155 on the basis of the positional relationship computed by the positional relationship computation unit 120, the feedback generation unit 130 generates feedback information for displaying the password in a hidden manner. The above feedback information is, for example, also provided to the processor that generates a display image of the display 151, and an image of the content 153 including the password input box 1531 in which the password is displayed in a hidden manner is displayed on the display 151.

With the generation of the feedback information described above, the user who is the operator or the owner of the content 153 (the user Ua in the example of FIG. 1) can input the password easily in plaintext when not visually recognized by another user (the user Ub) and can input the password in a hidden manner in other cases. The above-described switching is automatically executed on the basis of the positional relationship between the users (the user Ua and the user Ub) with respect to the display 151; accordingly, password security can be maintained while improving user usability when operating the content 153.

Figure 5B:
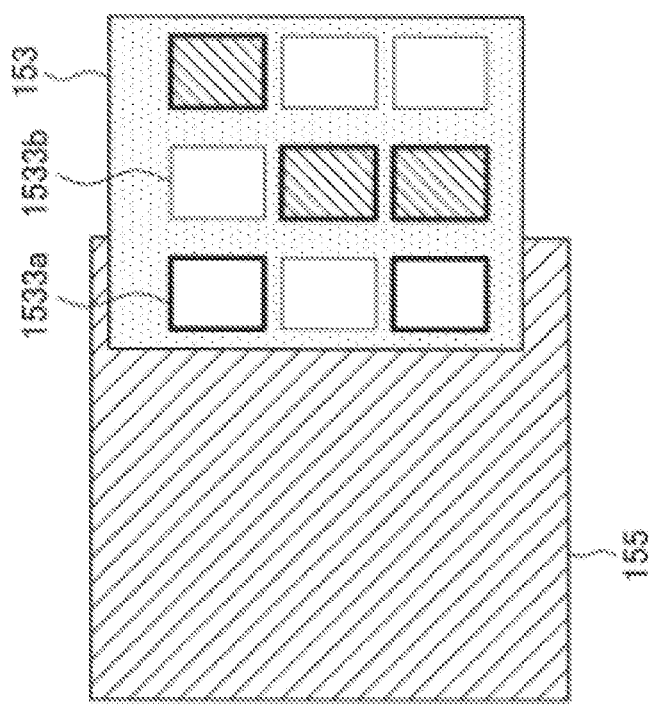
FIGS. 5A and 5B are each a diagram illustrating a second example of the feedback information according to the first embodiment of the disclosure.
Figure 5A:
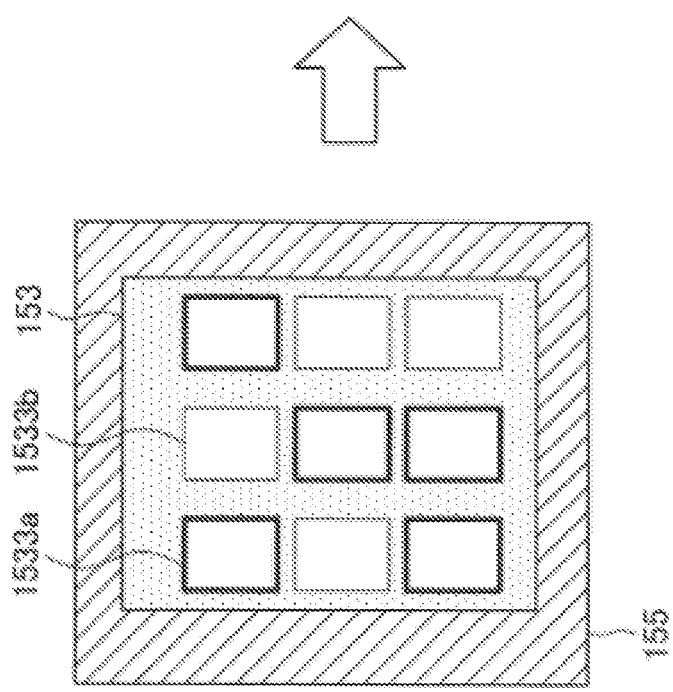

FIGS. 5A and 5B are diagrams each illustrating a second example of the feedback information according to the first embodiment of the disclosure. Referring to FIGS. 5A and 5B, the content 153 indicated on the display 151 includes item images 1533. The item images 1533 may be, for example, images or a thumbnail image of moving images or music clips that the user owns. The item images 1533 include private images 1533a that the user (the user Ua in the example of FIG. 1), who is the owner thereof, does not want to make public to others and public images 1533b that the user is willing to make public to others.

As illustrated in FIG. 5A, when the content 153 is displayed inside the shielded area 155, the private images 1533a and the public images 1533b are both visibly displayed. On the other hand, as illustrated in FIG. 5B, when a portion of the content 153 is displayed outside the shielded area 155, among the private images 1533a, the images positioned outside the shielded area 155 is made invisible (covered or made to disappear, for example). Meanwhile, the public images 1533b continue to be visibly displayed irrespective of whether they are inside or outside the shielded area 155.

In the present example, the feedback information generated by the feedback generation unit 130 is used to determine whether to visibly display the item images 1533 included in the content 153 on the display 151 or to make the item images 1533 invisible. When at least a portion of the content 153 is signified to be displayed outside the shielded area 155 by the positional relationship computed by the positional relationship computation unit 120, the feedback generation unit 130 generates feedback information for making the images, among the item images 1533 included in the content 153, that are private images 1533a and that are positioned outside the shielded area 155. The feedback information is, for example, provided to a processor that generates a display image of the display 151, and the images positioned outside the shielded area 155 is made invisible.

With the generation of the feedback information described above, the user who is the operator or the owner of the content 153 (the user Ua in the example of FIG. 1) can display, in the area not visually recognized by another user (the user Ub), the item image that includes private images, and display only the public images in other areas. The above-described switching is automatically executed on the basis of the positional relationship between the users (the user Ua and the user Ub) with respect to the display 151; accordingly, even if, for example, the display 151 is shared among a plurality of users, privacy can be obtained while viewing the item images 1533.

Figure 6:
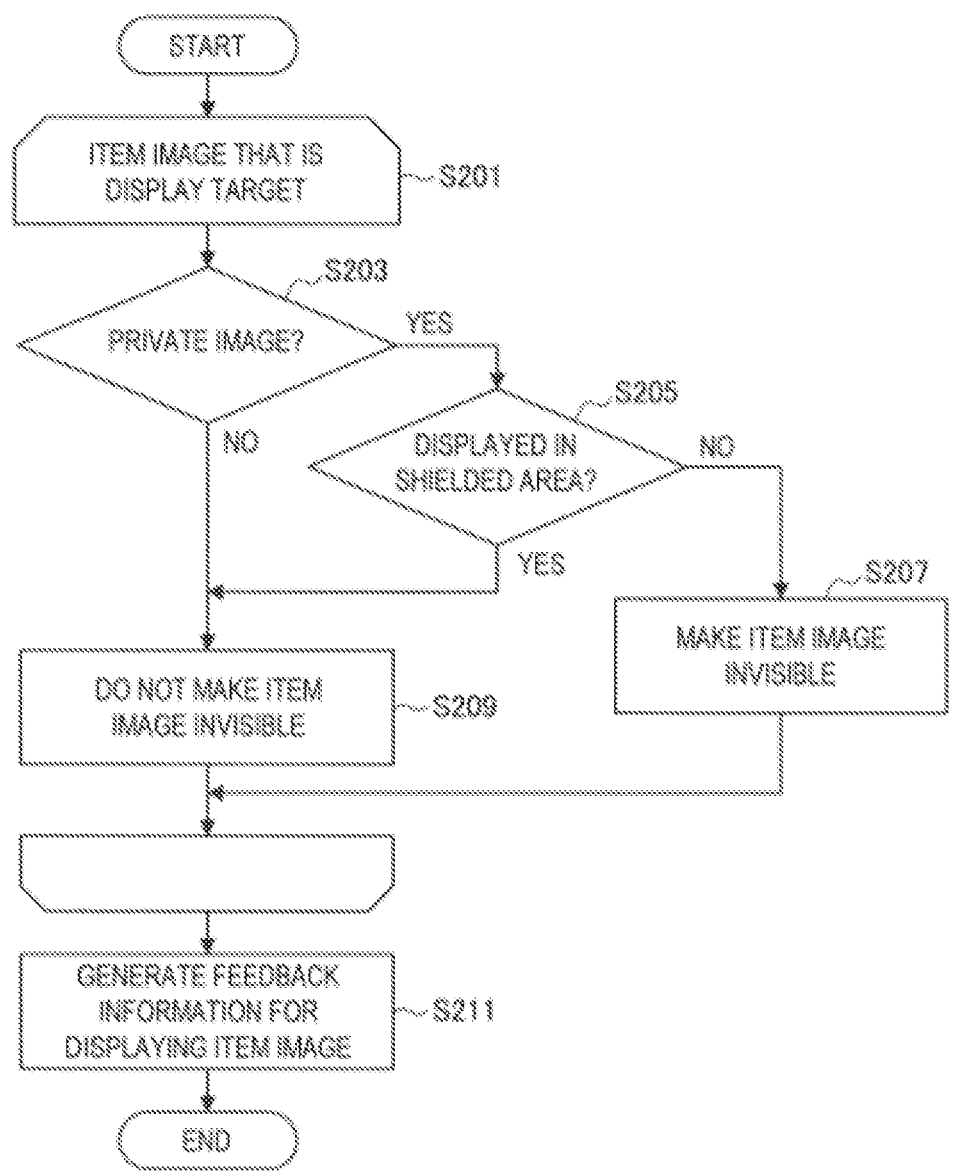
FIG. 6 is a flowchart illustrating the second example of the feedback information according to the first embodiment of the disclosure.

FIG. 6 is a flowchart illustrating the second example of the feedback information according to the first embodiment of the disclosure. Referring to FIG. 6, first, the feedback generation unit 130 acquires information of the item images that are targets to be displayed on the display 151 and executes a loop process on each of the item images (step S201).

In the loop process of step S201, first, the feedback generation unit 130 determines whether the item images are private images (step S203). When the item images are private images, the feedback generation unit 130 further determines whether the item images are displayed inside the shielded area 155 (step S205). Note that in the specification, private images refer to images that the user is unwilling to make public to others. Now, when the item images are displayed outside the shielded area 155, the feedback generation unit 130 makes the relevant item images invisible (step S207). The item images that have been made invisible are replaced with a filled image or are excluded from the display target, for example.

On the other hand, when it is determined that the item images are not private images (the items images are public images) in step S203 or when it is determined that the item images are displayed inside the shielded area 155 in step S205, the item images are not made invisible (step S209). Note that in the specification, public images refer to images that the user is willing to make public to others. When the loop process is completed on all of the item images, which are displayed targets, the feedback generation unit 130 generates feedback information for replacing the item images, which have been made invisible in step S207, with filled images or for excluding the item images, which have been made invisible in step S207, from the display target (step S211).

2. Second Embodiment

A second embodiment of the disclosure will be described next. In the second embodiment, feedback information is generated under a condition that is different from the condition of the first embodiment. More specifically, while the feedback information is generated on the basis of the relationship between the content 153 and the shielded area 155 of the display 151 in the first embodiment, in the present embodiment, feedback information is generated on the basis of the positional relationship itself between the display 151 and the user. Note that the outline and the device configuration of the present embodiment are similar to those of the first embodiment; accordingly, detailed description thereof will be omitted.

Figure 7C:
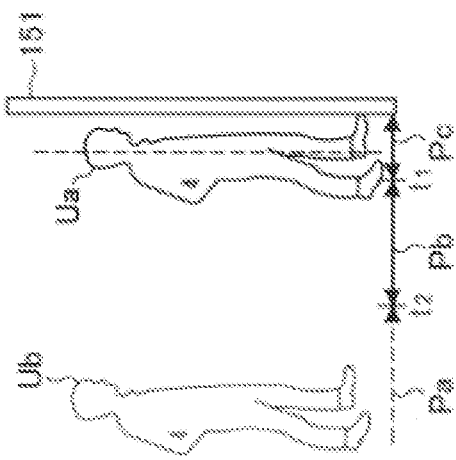
FIGS. 7A, 7B, and 7C are each a diagram for describing the feedback information according to a second embodiment of the disclosure.
Figure 7A:
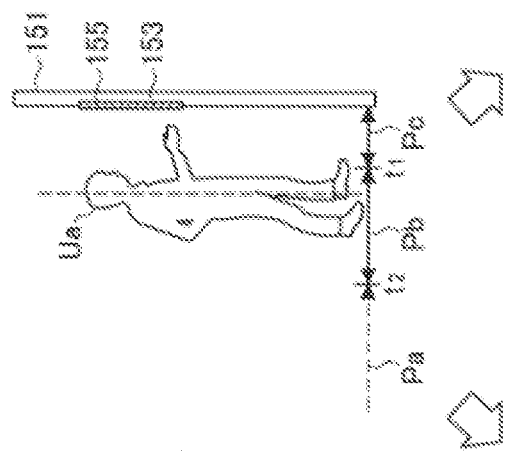
Figure 7B:
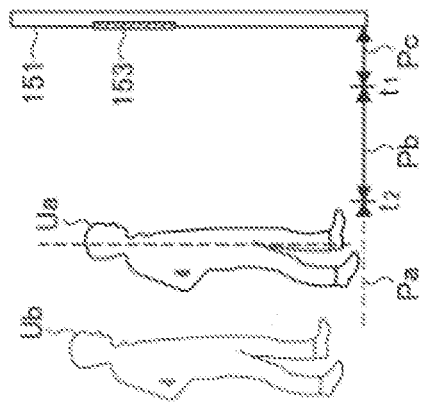

FIGS. 7A, 7B, and 7C are each a diagram for describing the feedback information according to the second embodiment of the disclosure. Referring to FIGS. 7A, 7B, and 7C, the user Ua, who is the owner of the content displayed on the display 151, is standing in front of the display 151. In front of the display 151, a content sharing area Pa, a content viewing area Pb, and a content deleting area Pc are set in accordance with the distance from the display 151. A boundary between the content sharing area Pa and the content viewing area Pb are determined by a threshold distance t2 from the display 151. Furthermore, a boundary between the content viewing area Pb and the content deleting area Pc is determined by a threshold distance t1 from the display 151.

As illustrated in FIG. 7A, when the user Ua is in the content viewing area Pb, for example, similar to the first embodiment described above, the feedback generation unit 130 generates feedback information, and the content 153 and the feedback information indicating the shielded area 155 are displayed on the display 151. The user Ua can, for example, automatically differ the display of the password and the item images between when the content 153 is inside the shielded area 155 and when the content 153 is outside the shielded area 155 while operating the content 153 displayed on the display 151.

On the other hand, as illustrated in FIG. 7B, when the user Ua is inside the content sharing area Pa, the content 153 is displayed on the display 151; however, the feedback information indicating the shielded area 155 is not displayed. The threshold distance t2 from the display 151 that defines the content sharing area Pa is set, for example, when the user Ua uses the touch panel to operate the content 153, at a distance that is too far from the touch panel such that operating of the touch panel is difficult. Accordingly, even if the user Ua in the content sharing area Pa is viewing the content 153, the possibility of the user operating the touch panel is thought to be small. Furthermore, in the above state, if there were to be a user Ub behind the user Ua, since the distance from the display 151 to the user Ua is large, in many cases, no shielded area 155 would be created or even if the shielded area 155 is created, the area would be small. Accordingly, in the present embodiment, when the user Ua is in the content sharing area Pa, it is determined that the user Ua has no intent of shielding the content 153 and, accordingly, no feedback information indicating the shielded area 155 is displayed. As another example, in the above case, irrespective of the position of the user Ub, the password may be displayed in a hidden manner or the private images may be made invisible.

Furthermore, as illustrated in FIG. 7C, when the user Ua is inside the content deleting area Pc, the content 153 and the feedback information indicating the shielded area 155 are both not displayed on the display 151. The threshold distance t1 from the display 151 that defines the content deleting area Pc is set, for example, when the user Ua uses the touch panel to operate the content 153, at a distance that is too near from the touch panel such that operating of the touch panel is difficult. Alternatively, be threshold distance t1 may be set at a distance that is too near to the display 151 such that the content 153 is difficult to view. Accordingly, the user Ua in the content deleting area Pc is not viewing the content 153 and, for example, there is a high possibility that the user Ua is trying to hide the content 153. Accordingly, in the present embodiment, when the user Ua is positioned in the content deleting area Pc, it is determined that the user Ua wants to hide the content 153 and, accordingly, the content 153 itself is hidden.

Figure 8:
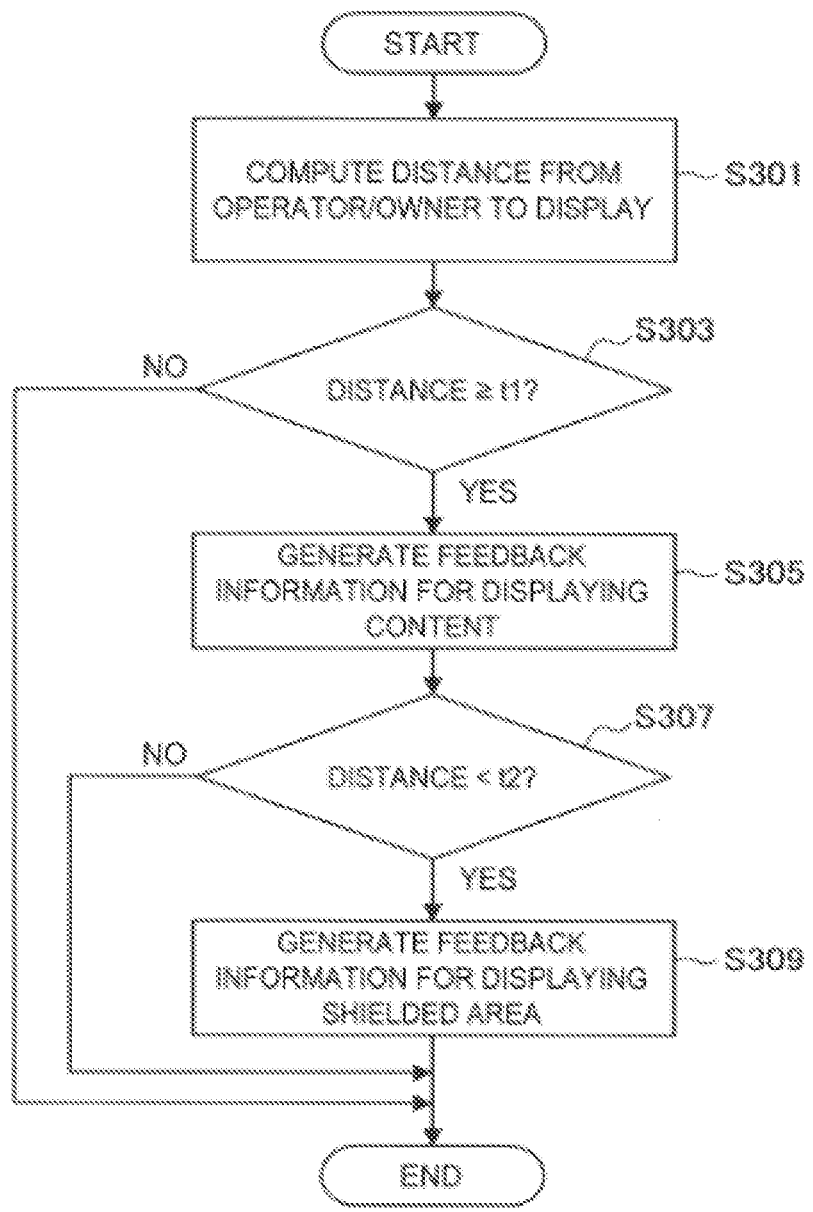
FIG. 8 is a flowchart illustrating a process performed by a feedback generation unit according to the second embodiment of the disclosure.

FIG. 8 is a flowchart illustrating a process performed by the feedback generation unit 130 according to the second embodiment of the disclosure. Referring to FIG. 8, first, the feedback generation unit 130 computes the distance from the operator or the owner of the content 153, who has been identified by the user identification unit 110, to the display 151 on the basis of the positional relationship, which has been computed by the positional relationship computation unit 120, between the display 151 and the user (step S301).

Subsequently, the feedback generation unit 130 determines whether the computed distance is equivalent to or larger than the threshold distance t1 (step S303). Now, as described above, the threshold distance t1 content deleting area Pc. When the computed distance is smaller than the threshold distance t1, the feedback generation unit 130 ends the process. In such a case, the content 153 is not displayed on the display 151. On the other hand, when the computed distance is equivalent to or larger than the threshold distance t1, the feedback generation unit 130 generates feedback information for displaying the content 153 (step S305). Similar to the other examples described above, the feedback information may be provided to a processor that generates a display image of the display 151.

Furthermore, the feedback generation unit 130 determines whether the computed distance is smaller than the threshold distance t2 (step S307). Now, as described above, the threshold distance t2 defines the content sharing area Pa. When the computed distance is equivalent to or larger than the threshold distance t2, the feedback generation unit 130 ends the process. In such a case, the content 153 is displayed on the display 151 and the feedback information is not displayed. On the other hand, when the computed distance is smaller than the threshold distance t2, the feedback generation unit 130 further generates feedback information for notifying the displaying of the shielded area 155 on the display 151 (step S309). Similar to the other examples described above, the feedback information may be provided to a processor that generates a display image of the display 151.

3. Third Embodiment

A third Embodiment of the disclosure will be described next. In the third embodiment, feedback information is output in a manner different to that of the first embodiment. More specifically, in the present embodiment, feedback information is output on the assumption that there are a plurality of users other than the operator or the owner of the content 153. Note that the outline and the device configuration of the present embodiment are similar to those of the first embodiment; accordingly, detailed description thereof will be omitted. Furthermore, the present embodiment may be combined with the first embodiment or the second embodiment.

Figure 9:
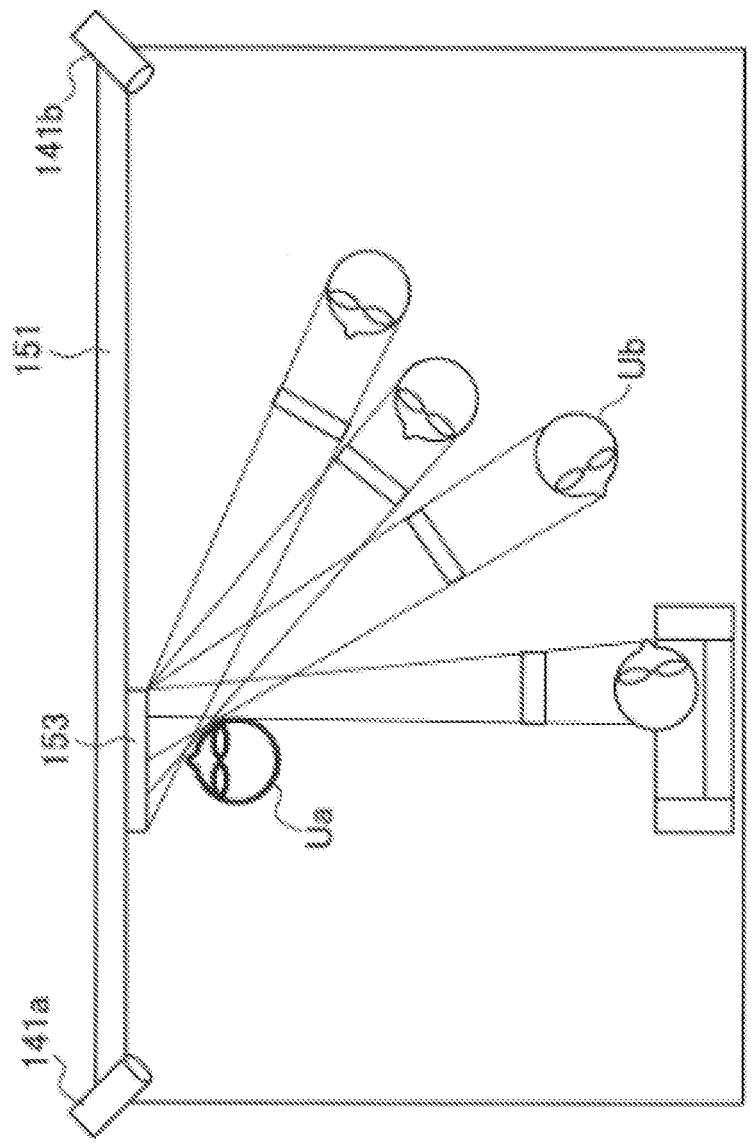
FIG. 9 is a diagram for describing an exemplary state according to a third embodiment of the disclosure.

FIG. 9 is a diagram for describing an exemplary state according to the third embodiment of the disclosure. Referring to FIG. 9, the user Ua who is the owner of the content 153 and users Ub are present in front of the display 151 on which the content 153 is displayed. In the illustrated example, there are a plurality of (four) users Ub. The positional relationships of the user Ua and the users Ub with respect to the display 151 are computed by the positional relationship computation unit 120 of the information processing apparatus 100 on the basis of images taken by the cameras 141a and 141b.

FIGS. 10A, 10B, 10C, and 10D are diagrams each illustrating a first example of the feedback information according to the third embodiment of the disclosure. Referring to FIGS. 10A, 10B, and 10C, in addition to the content 153, the shielded area 155 that cannot be visually recognized by all of the users Ub and a semi-shielded area 154 that cannot be visually recognized by either of the users Ub are displayed on the display 151 as feedback information. In the example illustrated in FIG. 10A, the entire area of the content 153 cannot be seen by any of the users Ub; accordingly, the shielded area 155 is displayed so as to overlap the entire content 153.

Furthermore, in the example illustrated in FIG. 10B, a portion of the area of the content 153 cannot be seen by all of the users Ub and a different portion of the area cannot be seen by some of the users Ub; accordingly, the shielded area 155 that partially overlaps the content 153, and the semi-shielded area 154 that overlaps the content 153 at a different portion of the content 153 are displayed. In the example illustrated in FIG. 10C, there is no area in the content 153 that cannot be seen by all of the users Ub, and only a portion of the area cannot be seen by some of the users Ub. In such a case, only the semi-shielded area 154 is displayed. In the example illustrated in FIG. 10D, the entire area of the content 153 is seen by all of the users Ub; accordingly, the semi-shielded area 154 is also not displayed.

For example, if the user Ua wants to hide the content 153 from the users Ub, the user Ua aims for the state illustrated in FIG. 10A in which the entire content 153 is in the shielded area 155. More specifically, for example, in the state illustrated in FIG. 10B, the user Ua moves the content 153 towards the shielded area 155 or moves his/her body so that the shielded area 155 spreads out towards the content 153.

On the other hand, if the user Ua wants to share the content 153 with the users Ub, the user Ua aims for the state illustrated in FIG. 10D in which the content 153 that does not overlap the shielded area 155 and the semi-shielded area 154. More specifically, for example, in the state illustrated in FIG. 10B, the user Ua moves the content 153 towards the opposite side with respect to the shielded area 155 or moves his/her body so that the shielded area 155 moves towards the opposite side with respect to the content 153. Furthermore, for example, in the state illustrated in FIG. 10C, the user Ua moves the content 153 so that the semi-shielded area 154 disappears.

FIGS. 11A, 11B, 11C, and 11D are diagrams each illustrating a second example of the feedback information according to the third embodiment of the disclosure. Referring to FIGS. 11A, 11B, 11C, and 11D, feedback information 1550 is displayed on the display 151 separately from the content 153. In the feedback information 1550, the state in front of the display 151, such as the state illustrated with reference to FIG. 9, is expressed with icons. For example, throughout the examples illustrated in FIGS. 11A, 11B, 11C, and 11D, a content icon 1551 that schematically illustrates the displayed content 153 and an owner icon 1553 that illustrates the user Ua who is the owner of the content 153 are displayed in the feedback information 1550.

Meanwhile, user icons 1555, 1557, and 1559 other than the owner icon 1553 each illustrate a user Ub that is capable of visually recognizing a different area of the content 153. The user icon 1555 displayed in the example illustrated in FIG. 11A illustrates a user who is unable to visually recognize the content 153 at all. Furthermore, the user icons 1557 displayed in the examples illustrated in FIGS. 11B and 11C each illustrate a user who can visually recognize a portion of the content 153. Furthermore, the user icons 1559 displayed in the examples illustrated in FIGS. 11C and 11D each illustrate a user who can visually recognize the entire content 153.

The display of the user icons 1555, 1557, and 1559 displayed so as to correspond to the actual position of the users Ub with respect to the display 151 allows the user Ua, who is the owner of the content 153, to not only know whether the content 153 is included in the shielded area but also allows the user to know which other users Ub in which position can visually recognize the content 153. Accordingly, the user Ua can move the content 153 or his/her body so that the content 153 can be viewed or so that the content 153 cannot be viewed by the other users Ub from the respective positions. Note that when there are a plurality of other users Ub, selection of which users Ub are to be the display targets of the user icon 1555, 1557, and 1559 may be carried out in the GUI of the feedback information 1550, for example.

4. Fourth Embodiment

A fourth embodiment of the disclosure will be described next. In the fourth embodiment as well, feedback information is output in a manner different to that of the first embodiment. More specifically, in the present embodiment, feedback information is output for indicating actions that the operator or the owner of the content 153 may take. Note that the outline and the device configuration of the present embodiment are similar to those of the first embodiment; accordingly, detailed description thereof will be omitted. Furthermore, the present embodiment may be combined with one or some, or all of the first embodiment to the third embodiment.

FIGS. 12A and 12B are each a diagram for describing an exemplary state according to the fourth embodiment of the disclosure. Referring to FIGS. 12A and 12B, the content 153a owned by the user Ua and content 153b owned by the user Ub are displayed on the display 151. Since the user Ub is positioned behind the user Ua when viewed from the display 151, a shielded area Qa that the user Ub cannot visually recognize may be created in the display 151. Note that in the illustrated drawing, since the user Ub is sitting sideways to the display 151, only the portion on the right side of the display 151 is included in the visual field of the user Ub. In the display 151, the area that can be visually recognized by the user Ub is illustrated as an area Qb.

For example, in the example illustrated in FIG. 12A, since the user Ua is standing on the right side of the display 151, the shielded area Qa is the area overlapped by the user Ua in the area of the display 151 that is included in the visual field of the user Ub. On the other hand, in the example illustrated in FIG. 12B, since the user Ua is standing on the left side of the display 151, the entire area of the display that is included in the visual field of the user Ub is the area Qb that can be visually recognized.

Figure 13A:
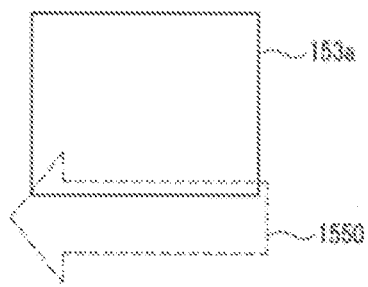
FIG. 13A is a diagram illustrating an example of the feedback information according to the fourth embodiment of the disclosure.
Figure 13B:
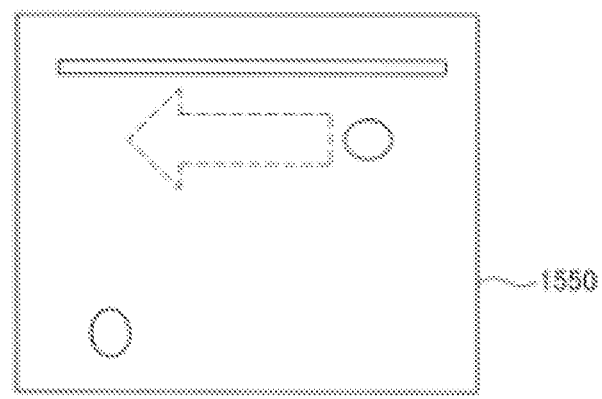
FIG. 13B is a diagram illustrating an example of the feedback information according to the fourth embodiment of the disclosure.

FIGS. 13A and 13B are diagrams each illustrating an example of the feedback information according to the fourth embodiment of the disclosure. Referring to FIG. 13A, the feedback information 1550 is displayed in the vicinity of the content 153a displayed on the display 151 and, with a figure such as, for example, an arrow, encourages the user Ua to move. The moving direction indicated by the feedback information 1550 is, as illustrated in the example of FIG. 12B, a direction that reduces the shielded area Qa of the other user Ub.

On the other hand, referring to FIG. 13B, the feedback information 1550 is displayed on the display 151 separately from the content 153a, and the positional relationship between the display 151, the user Ua, and the user Ub are displayed with icons. Furthermore, the feedback information 1550 may include a FIG. such as an arrow that encourages the user Ua to move. Different from the feedback information 1550 illustrated in FIG. 13A, the user Ua may decide to move or not to move after understanding for what kind of situation is necessary for the user Ua to move.

Figure 14:
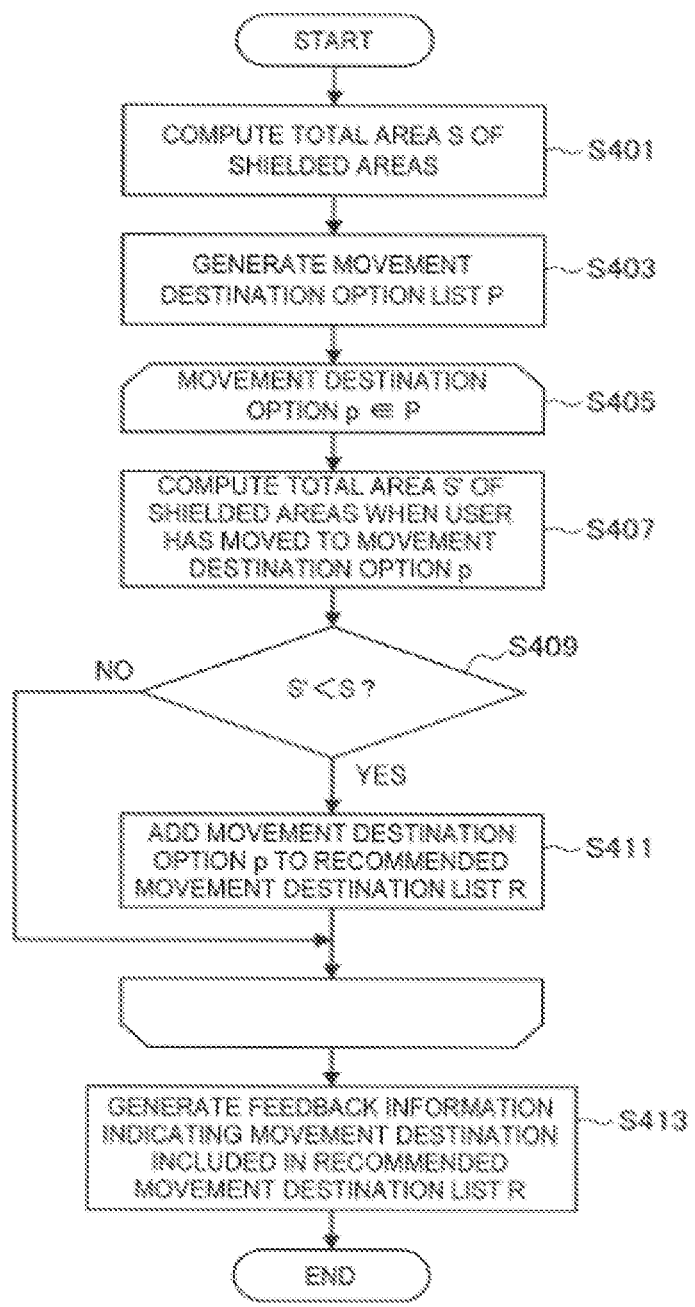
FIG. 14 is a flowchart illustrating a process for displaying the feedback information according to the fourth embodiment of the disclosure.

FIG. 14 is a flowchart illustrating a process for displaying the feedback information according to the fourth embodiment of the disclosure. Referring to FIG. 14, first, the feedback generation unit 130 computes a total area S of the shielded areas Qa of the users (the users Ub) other than the operator or the owner (the user Ua) of the content 153 (step S401). Note that the area of the shielded area Qa of each user may be computed, for example, on the basis of the positional relationship between each user and the display 151 that has been computed by the positional relationship computation unit 120 and on the basis of the visual field of each user that is specified by image recognition or the like.

Subsequently, the feedback generation unit 130 generates a movement destination option list P of the operator or the owner (the user Ua) of the content 153 (step S403). Then after, the feedback generation unit 130 computes a total area S' of the shielded area Qa of the users Ub for each movement destination of the user Ua; however, it is not practical to execute the above process on the entire space in front of the display 151 and, accordingly, the process is executed while limiting the moving destination options to a number of moving destination options. For example, a case in which the user Ua moves to the left and right in a parallel manner with respect to the display 151 may be included in the movement destination option list P. In such a case, since the distance from the user Ua to the display 151 does not change, the movement may be a reasonable choice for the user Ua. Furthermore, for example, a movement destination option in a case in which the user Ua moves a step or two may be included in the movement destination option list P. In such a case, the movement destination option may include a movement that changes the distance from the user Ua to the display 151.

Subsequently, the feedback generation unit 130 executes a loop process on the movement destination options p that are included in the movement destination option list P (step S405). At this point, the feedback generation unit 130 computes each total area S' of the shielded areas Qa of the users Ub when the user Ua moves to each of the movement destination options p (step S407). The area S' may be computed, for example, by executing computation similar to that of step S401 once more after parallely moving the image of the user Ua that is presently detected to the movement destination option p. The feedback generation unit 130 determines whether S'<S, that is, the feedback generation unit 130 determines whether the movement of the user Ua to the movement destination option p reduces the shielded areas Qa of the users Ub (step S409), and when S'<S holds true, adds the movement destination option p subject to the process to a recommended movement destination list R (step S411).

After the above-described loop process is completed on all of the movement destination options p included in the movement destination option list P, the feedback generation unit 130 generates feedback information for displaying information indicating the movement destination included in the recommended movement destination list R (step S413). Based on the above feedback information, information illustrated in FIGS. 13A and 13B, for example, is displayed to the user Ua.

With the output of the above-described information, the operator or owner of the content 153 can move to a position that allows more users including the other users Ub to view the display 151. In many cases, the other users Ub are positioned behind the user Ua and are not easily noticed by the user Ua; however, appropriate information can be provided to the user Ua with the above-described process.

5. Hardware Configuration

Figure 15:
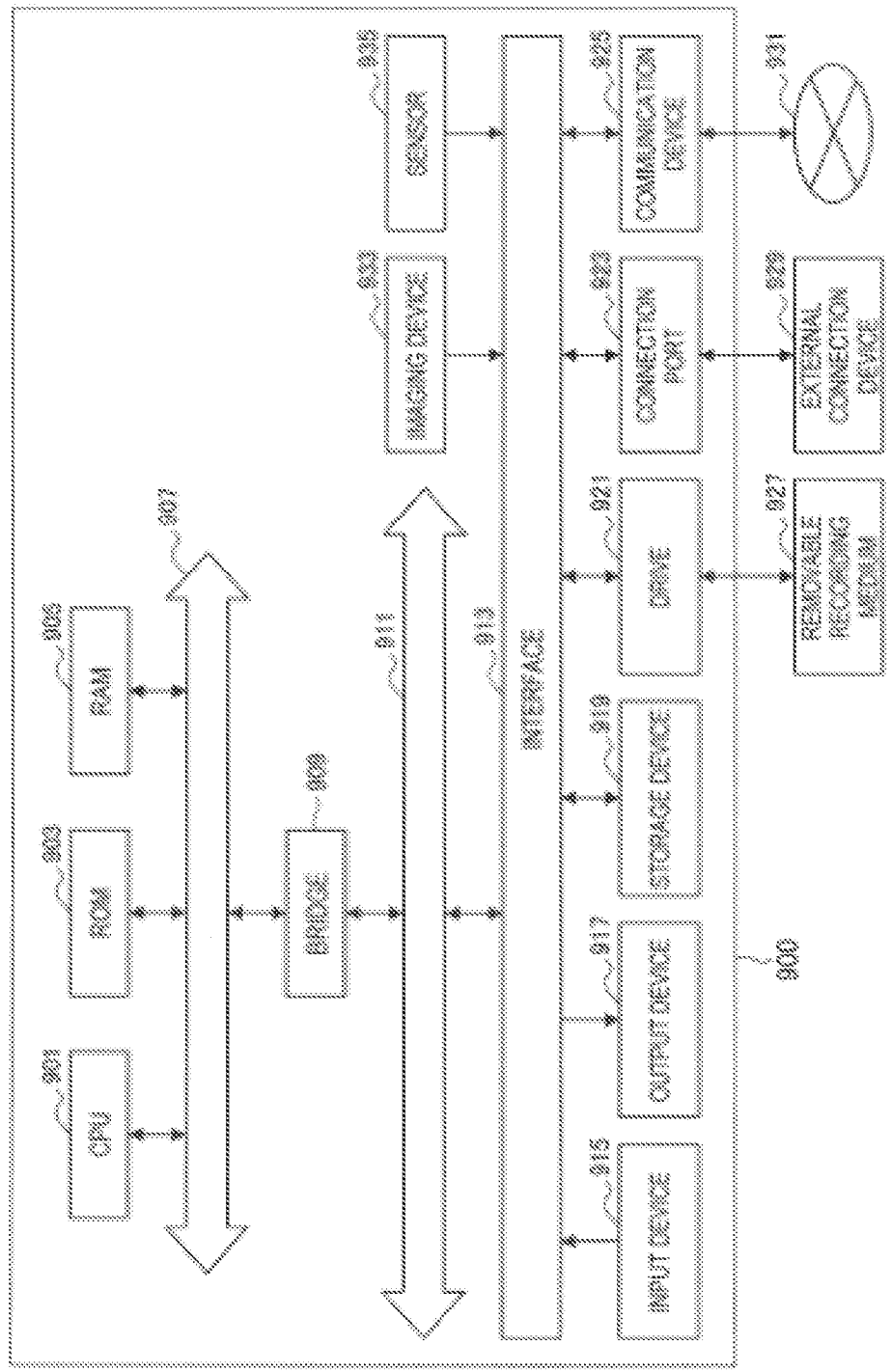
FIG. 15 is a block diagram illustrating an exemplary hardware configuration of the information processing apparatus according to the embodiments of the disclosure.

The hardware configuration of the information processing apparatus according to the embodiments of the disclosure will be described next with reference to FIG. 15. FIG. 15 is a block diagram illustrating an exemplary hardware configuration of the information processing apparatus according to the embodiments of the disclosure.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as an LCD (Liquid Crystal Display), a PDP (Plasma Display Panel), and an organic EL (Electro-Luminescence) displays, an audio output device such as a speaker or a headphone, and a peripheral device such as a printer. The output device 917 may output the results obtained from the process of the information processing apparatus 900 in a form of a video such as text or an image, and an audio such as voice or sound.

The storage device 919 is a device for data storage which is configured as an example of a storage unit of the information processing apparatus 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (registered trademark) (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

6. Supplementary Description

The embodiments of the disclosure may include, for example, the information processing apparatus described above, a system, an information processing method executed in the information processing apparatus or the system, a program for functioning the information processing apparatus, and a non-transitory tangible medium having a program stored therein.

Although the preferred embodiments of the present disclosure have been described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

Additionally, the present technology may also be configured as below.

(1) An information processing apparatus including:

a positional relationship acquiring unit configured to acquire information of a positional relationship of users near a display with respect to the display; and a feedback generation unit configured to generate feedback information for a first user on a basis of the information of the positional relationship, the first user being a user among the users and operating or owning content displayed on the display.

(2) The information processing apparatus according to (1), wherein the feedback generation unit is configured to generate feedback information on a basis of an estimation result of a shielded area, the shielded area being an area shielded from a second user, who is a user among the uses and is different from the first user, because of a presence of the first user.

(3) The information processing apparatus according to (2), wherein the feedback generation unit is configured to generate feedback information for displaying a figure indicating the shielded area on the display.

(4) The information processing apparatus according to (2), wherein the feedback generation unit is configured to generate feedback information for changing a display of the content in accordance with the positional relationship of the content and the shielded area.

(5) The information processing apparatus according to (4), wherein the feedback generation unit is configured to, inside the shielded area, generate feedback information for making a password be displayed in plaintext, the password being included in the content, and is configured to, outside the shielded area, generate feedback information for hiding the password.

(6) The information processing apparatus according to (4), wherein the feedback generation unit is configured to, inside the shielded area, generate feedback information for displaying at least one item included in the content in a visible manner and is configured to, outside the shielded area, generate feedback information for making one or some of the at least one item invisible.

(7) The information processing apparatus according to (6), wherein the feedback generation unit is configured to, outside the shielded area, generate feedback information for making, among the at least one item, a private item of the first user invisible.

(8) The information processing apparatus according to any one of (2) to (7),
wherein the second user includes a plurality of users, and
wherein the feedback generation unit is configured to generate feedback information for displaying, on the display, a figure that indicates a first shielded area that is shielded from one or some of the plurality of users and a figure that indicates a second shielded area that is shielded from all of the plurality of users.

(9) The information processing apparatus according to any one of (2) to (8),
wherein the second user includes a plurality of users, and
wherein the feedback generation unit is configured to generate feedback information for displaying, on the display, each of the plurality of users, the first user, and the content as an icon.

(10) The information processing apparatus according to any one of (2) to (9),
wherein the feedback generation unit is configured to generate feedback information for displaying an action that the first user is allowed to take in order to reduce the shielded area.

(11) The information processing apparatus according to (10),
wherein the action that the first user is allowed to take is to move to a movement destination among predetermined movement destination options, and
wherein the feedback generation unit is configured to generate feedback information for displaying a movement destination that reduces the shielded area compared to the shielded area before the movement of the first user, the movement destination being a movement destination among the movement destination options.

(12) The information processing apparatus according to any one of (1) to (11),
wherein the feedback generation unit is configured to generate feedback information on a basis of a distance of the first user to the display.

(13) The information processing apparatus according to (12),
wherein the feedback generation unit is configured to generate feedback information for displaying, on the display, the content when the distance is equivalent to or larger than a first threshold.

(14) The information processing apparatus according to (13),
wherein the feedback generation unit is configured to generate feedback information for displaying, on the display, a figure indicating a shielded area, the shielded area being an area shielded from the second user because of a presence of the first user, when the distance is equivalent to or larger than a second threshold that is larger than the first threshold.

(15) The information processing apparatus according to any one of (1) to (14), further including:
the display.

(16) The information processing apparatus according to any one of (1) to (14), further including:
an input unit that receives input information for the positional relationship acquiring unit.

(17) The information processing apparatus according to (16),
wherein the input unit includes a sensor.

(18) The information processing apparatus according to (17),
wherein the input unit includes a plurality of cameras.

(19) An information processing method including:
acquiring information of a positional relationship of users near a display with respect to the display; and
generating, with a processor, feedback information for a first user on a basis of the information of the positional relationship, the first user being a user among the users and operating or owning content displayed on the display.

(20) A program for causing a computer to execute:
a function of acquiring information of a positional relationship of users near a display with respect to the display; and
a function of generating feedback information for a first user on a basis of the information of the positional relationship, the first user being a user among the users and operating or owning content displayed on the display.

What is claimed is:
1. An information processing apparatus comprising:
a positional relationship acquiring unit configured to acquire information of a positional relationship of users near a display with respect to the display; and
a feedback generation unit configured to generate feedback information for a first user on a basis of the information of the positional relationship, the first user being a user among the users and operating or owning content displayed on the display,
wherein the feedback generation unit is configured to generate feedback information on a basis of an estimation result of a shielded area, the shielded area being an area shielded from a second user because of a presence of the first user.

2. The information processing apparatus according to claim 1,
wherein the feedback generation unit is configured to generate the feedback information for displaying a figure indicating the shielded area on the display.

3. The information processing apparatus according to claim 1,
wherein the feedback generation unit is configured to generate the feedback information for changing a display of the content in accordance with the positional relationship of the content and the shielded area.

4. The information processing apparatus according to claim 3,
wherein the feedback generation unit is configured to, inside the shielded area, generate the feedback information for making a password be displayed in plaintext, the password being included in the content, and is configured to, outside the shielded area, generate the feedback information for hiding the password.

5. The information processing apparatus according to claim 3,
wherein the feedback generation unit is configured to, inside the shielded area, generate the feedback information for displaying at least one item included in the content in a visible manner and is configured to, outside the shielded area, generate the feedback information for making one or some of the at least one item invisible.

6. The information processing apparatus according to claim 5,
wherein the feedback generation unit is configured to, outside the shielded area, generate the feedback information for making, among the at least one item, a private item of the first user invisible.

7. The information processing apparatus according to claim 1,
wherein the second user includes a plurality of users, and
wherein the feedback generation unit is configured to generate the feedback information for displaying, on the display, a figure that indicates a first shielded area that is shielded from one or some of the plurality of users and a figure that indicates a second shielded area that is shielded from all of the plurality of users.

8. The information processing apparatus according to claim 1,
wherein the second user includes a plurality of users, and
wherein the feedback generation unit is configured to generate the feedback information for displaying, on the display, each of the plurality of users, the first user, and the content as an icon.

9. The information processing apparatus according to claim 1,
wherein the feedback generation unit is configured to generate the feedback information for displaying, on the display, an action that the first user is allowed to take in order to reduce the shielded area.

10. The information processing apparatus according to claim 9,
wherein the action that the first user is allowed to take is to move to a movement destination among predetermined movement destination options, and
wherein the feedback generation unit is configured to generate the feedback information for displaying, on the display, a movement destination that reduces the shielded area compared to the shielded area before the movement of the first user, the movement destination being a movement destination among the movement destination options.

11. The information processing apparatus according to claim 1,
wherein the feedback generation unit is configured to generate the feedback information on a basis of a distance of the first user to the display.

12. The information processing apparatus according to claim 11,
wherein the feedback generation unit is configured to generate the feedback information for displaying, on the display, the content in case the distance is equivalent to or larger than a first threshold.

13. The information processing apparatus according to claim 12,
wherein the feedback generation unit is configured to generate the feedback information for displaying, on the display, a figure indicating a shielded area, the shielded area being an area shielded from the second user because of a presence of the first user, in case the distance is equivalent to or larger than a second threshold that is larger than the first threshold.

14. The information processing apparatus according to claim 1, further comprising: the display.

15. The information processing apparatus according to claim 1, further comprising: an input unit that receives input information for the positional relationship acquiring unit.

16. The information processing apparatus according to claim 15, wherein the input unit includes a sensor.

17. The information processing apparatus according to claim 16, wherein the input unit includes a plurality of cameras.

18. An information processing method comprising:
acquiring information of a positional relationship of users near a display with respect to the display; and
generating, with a processor, feedback information for a first user on a basis of the information of the positional relationship, the first user being a user among the users and operating or owning content displayed on the display
wherein the feedback information is generated on a basis of an estimation result of a shielded area, the shielded area being an area shielded from a second user because of a presence of the first user.

19. A non-transitory computer-readable medium having stored thereon, a set of computer-executable instructions which, when executed by a computer, cause the computer to perform steps comprising:
acquiring information of a positional relationship of users near a display with respect to the display; and
generating feedback information for a first user on a basis of the information of the positional relationship, the first user being a user among the users and operating or owning content displayed on the display,
wherein the feedback information is generated on a basis of an estimation result of a shielded area, the shielded area being an area shielded from a second user because of a presence of the first user.

* * * * *